United States Patent [19]

Gloggler

[11] 4,217,860
[45] Aug. 19, 1980

[54] DEVICE FOR LATERALLY DEFINING A CATTLE STALL

[76] Inventor: Martin Gloggler, Memelstrasse 34, D-7910 Neu-Ulm, Fed. Rep. of Germany

[21] Appl. No.: 956,182

[22] Filed: Oct. 31, 1978

[51] Int. Cl.² ............................ A01K 29/00; A01K 1/00
[52] U.S. Cl. ........................................................ 119/27
[58] Field of Search ................. 119/11, 14.03, 27, 96, 119/155, 15

[56] References Cited

U.S. PATENT DOCUMENTS

| 226,131 | 3/1880 | Tallman | 119/11 |
|---|---|---|---|
| 1,142,246 | 6/1915 | Gagan | 119/27 |
| 1,359,905 | 11/1920 | Molyneux | 119/96 |
| 3,802,392 | 4/1974 | Andersen | 119/27 |
| 3,986,481 | 10/1976 | Glöggler et al. | 119/27 |

Primary Examiner—Louis G. Mancene
Assistant Examiner—Robert P. Swiatek
Attorney, Agent, or Firm—Fleit & Jacobson

[57] ABSTRACT

A device for laterally defining a cattle stall. The device has an upright pipe supported in a floor of the cattle stall and a self-supporting bail supported by upper portions of the pipe. The lower arm of the bail is positioned above the floor at a height greater than the height of a prostrate or prone animal occupying the stall. A resilient or flexible belt has an upper end connected to the lower member and a lower end connected to the floor of the stall. The belt has a width sufficient to cover at least two ribs of an animal occupying the stall and protects the animal from injury resulting from contact with the lower portion of the bail.

14 Claims, 3 Drawing Figures

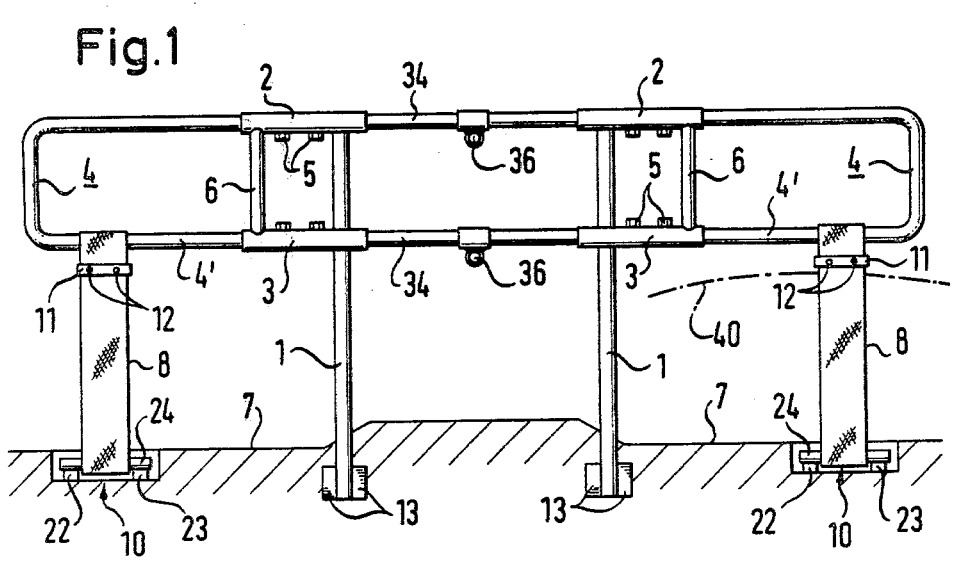
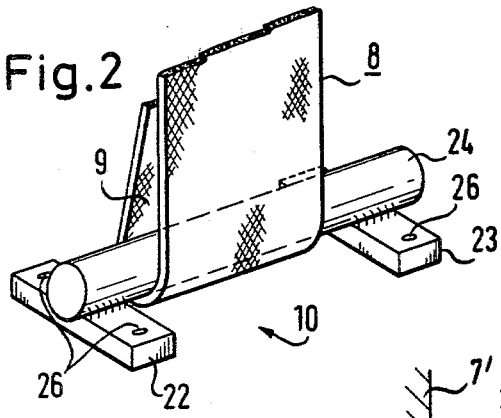
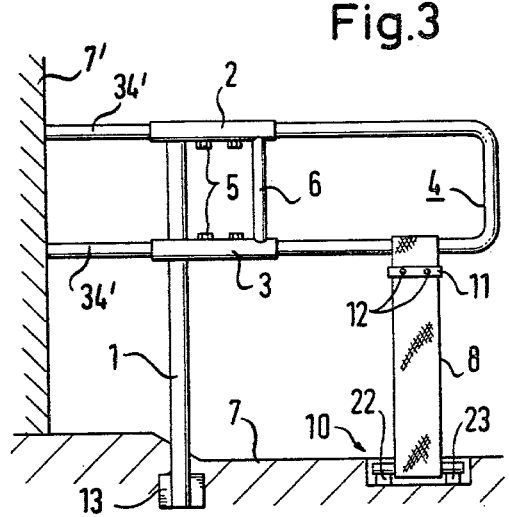

DEVICE FOR LATERALLY DEFINING A CATTLE STALL

This invention relates to a device for laterally defining a cattle stall located in a cow shed or cow barn, in which a boundary element extending at least into the rear of said stall is positioned in a substantially vertical pipe anchored in the floor.

It is generally customary to employ partition elements consisting of a pipe construction to define the individual cattle stalls in a cow shed. Said pipe construction can include a pipe bail secured to upright pipes embedded in the floor of the stall. Such an arrangement is already known from U.S. Pat. No. 1,996,196.

The known arrangements, however, suffer from various drawbacks. If the pipe construction projects downwardly near the floor, the animals are hampered considerably when attempting to lie down or stand up. Furthermore, they may injure themselves if they bump against the pipe construction. In addition, such constructions only permit the animal to lie on its abdomen and haunches, since it cannot lie on its side without being hindered unbearably, thus possibly inflicting self-injury.

If the pipe construction of the partition elements does not reach the floor, the animals have greater freedom of movement, of course, but it is possible for one animal to hinder or obstruct a neighboring animal. Moveover, under certain circumstances, one animal can be injured when another animal makes use of its greater freedom of movement. Experience shows that animals whose freedom of movement is restricted by a neighboring animal suffer udder and rib injury.

The object of the invention is therefore to provide a device for laterally defining a cattle stall of the type cited at the outset which ensures maximum freedom of movement without simultaneously hampering or hindering neighboring animals and without any possibility of injury.

This object is accomplished in accordance with the invention in that the boundary element is disposed at such a minimum height that the lower edge thereof is located above a prostrate animal, that at least one flexible belt is located in the rear portion of the cattle stall between said boundary element and the stall floor and that the width of said belt is dimensioned such that the belt covers at least two ribs of the animal.

The present invention enjoys the essential advantage that an animal has an especially great amount of freedom of movement, in particular near the floor, and can also utilize the available space completely, since the animal can lean against the belt without any danger of self-inflicted injury.

Furthermore, in spite of the extraordinarily large freedom of movement for the individual animal, there is still a clear separation between the individual cattle stalls, thus maintaining order in the cow shed.

All rib injuries and contusions which are easily inflicted by the pipe construction in the case of conventional partition elements are eliminated completely by the inventive device. The invention preferably provides that the belt has a width of at least 15 cm (approx. 6 inches) and a thickness of approximately 5 mm (approx. ¼ in), thereby ensuring that at least two rib arches of the animal have support. In this way, an animal can even lean against the belt firmly without any danger of causing contusions or injury,. The most expedient type and arrangement of the belt depend on the size and weight of the respective animal.

The invention is also advantageous because, owing to the adaptable lateral separation, it is possible for the animals to lie down and stretch out completely, a position which ensures the greatest possible relaxation.

A preferable embodiment of the invention also provides that the boundary element is a self-supporting bail which extends into the rear section of the cattle stall. Another preferable embodiment of the invention provides that the boundary element includes support arms with pipe sockets attached to the upright pipe and that the legs of said bail are releasably inserted into the open ends of said pipe sockets. In a further advantageous development of the subject matter of the invention, not only U-shaped bails, for instance, can be inserted, but hoisting or lifting equipment or a claw manicure set or similar equipment can also be mounted and secured in an especially simple and easy manner.

Moreover, support arms adapted to receive a self-supporting separating bail, a neck yolk or a barrier can be attached to the upright pipes. In this way, for instance, a neck yolk can be adjusted in height as well so that the stall is adapted optimally to a specific breed or specific size of animal. This also makes it possible to keep the stall floor exceptionally clean.

The inventive device is also extraordinarily advantageous in its entirety in that a great deal of special consideration is shown for the anatomy of the animals, enabling them to execute natural movements when lying down, when resting and when standing up in the same manner to which they are accustomed in pasture.

The invention will now be described in the followed by way of example with reference to the drawing, in which:

FIG. 1 is a schematic lateral elevation of a double cattle stall,

FIG. 2 is a perspective view of a floor anchor for a belt to be secured to the stall floor, and FIG. 3 is a schematic lateral elevation of a wall stall for cattle.

The device illustrated in FIG. 1 consists of an upright pipe 1 with two pipe sockets 2 and 3 attached thereto and adapted to receive a removable, self-supporting bail 4. The bail 4 is secured to the pipe sockets 2 and 3 by means of screws 5. The pipe sockets are interconnected by a pipe 6 in order to stabilize them. A belt 8 is positioned between the lower leg 4' of the bail 4 and the stall floor 7 and forms a loop 9 which encompasses a bar 24 in the floor anchor 10 as shown in detail in FIG. 2. The belt 8 is secured to the lower leg 4' of said bail 4 with the aid of two clamping brackets 11 which are clamped into position on both sides of the looped belt by means of screws 12. In so doing, the screws 12 pass through both the belt and the clamping brackets. Of course, the loop can be sewn to the belt previously. In this case, the lower leg 4' of the bail 4 is pushed through the loop 9 and the bail 4 is thereafter inserted into the pipe sockets 2 and 3.

The upright pipe is provided at its lower end with projections 13 which are anchored in the floor in order to prevent the upright pipe 1 from undergoing torsion due to the substantial lever action which an animal can exert on the bail 4.

For the purpose of illustration, the dot-and-dash line 40 in FIG. 1 indicates the back of an animal lying in the illustrated cattle stall. In other words, the line 40 depicts the maximum height attained by the body of a prone or prostrate animal. Hence, when lying down, the animal only comes into contact with the resilient belt so that the animal can lean against it even quite firmly without causing any contusions or injury. The belt can be adjusted in such a way that it bulges in a predetermined manner when an animal exerts a strong force against it.

FIG. 1 illustrates an embodiment of the inventive device in which two cattle stalls are arranged opposite one another in a head-to-head arrangement. The two stalls are preferably interconnected by bars 34 which are inserted into the pipe sockets 2 and 3 in the form of pipes. Barriers in the form of transversely disposed pipes 36 are expediently provided in the middle between the two stalls.

FIG. 2 illustrates in a perspective view how the belt 8 is anchored to the stall floor 7. The floor anchor depicted in FIG. 2, designated in its entirety by number 10, consists substantially of a bar 24 which is substantially horizontal when in use and which is welded at both ends to a floor plate 22 or 23. Each of the floor plates 22 and 23 has two holes 26. They are preferably between approx. 5-10 mm (approx. ¼-⅜ in) in height. The loop 9 of the belt 8 is dimensioned such that the bar 24 together with both welded plates 22 and 23 can be inserted through the loop 9. After being rotated by approx. 90 degrees, the two floor plates 22 and 23 are then placed flat on the stall floor and secured thereto with the aid of screws (not shown). This floor anchor is not advantageous only because it is extremely easy to mount, but it is also especially advantageous because the lower loop 9 of the belt 8 is also kept at a spaced distance away from the stall floor 7 so that it remains clean and dry. In order to have adequate strength and, at the same time, the desired elasticity, the belt expediently consists of a polyester material. The belt preferably has a thickness of approx. 5 mm (¼ in) and a width approx. 150 mm (6 in) in size. In any case, the belt should be wide enough to cover at least two of the animal's ribs which are to lean against it. Any sufficiently strong, elastic and unsoiling material is suitable for producing the belt.

FIG. 3 is a schematic lateral elevation showing a device similar to that in FIG. 2 with the sole difference that here a wall stall is illustrated in which the spacing between the upright pipe 1 and the wall 7' is closed off by bars 34' which are inserted in the pipe sockets 2 and 3. The structure and the function of the cattle stall illustrated in FIG. 3 otherwise correspond to the device shown in the right half of FIG. 1.

Instead of the embodiment shown in FIGS. 1 and 3, the stall could also be arranged in such a manner that the bars 34 and 34' each form an integral member with the pipe socket 2 and 3. In this case, pipe 6 could be omitted.

The animals in the inventive cattle stall can lie down and stand up naturally as they are accustomed to doing when out to pasture.

What is claimed is:

1. A device for laterally defining a cattle stall comprising:
   upright support means (1) having a lower end anchorable in a floor of a cattle stall; and boundary means including a bail (4) for defining a lateral boundary of the cattle stall supported by said support means and extending from said support means towards an entrance of the stall, said boundary means including:
   a generally horizontally-extending lower member (4') supported by said support means and positionable above the floor at a predetermined height, the height being greater than the height of a prostrate or prone animal occupying the stall;
   a generally horizontally-extending upper member supported by said support means and positioned above said lower member;
   a flexible belt (8) spaced from said support means and extending from said lower member to the floor of the cattle stall, the belt having a predetermined width sufficiently wide to cover at least two ribs of an animal occupying the stall; and
   means for connecting a lower end of said belt to the floor of the stall so that said belt protects an animal from injury from contact with said lower member or an adjacent animal.

2. A device according to claim 1, wherein said lower and said upper members are interconnected to form the bail supported by said support means.

3. A device according to claim 2, further comprising pipe sockets (2, 3) connected to said support means, said bail having legs insertable into open ends of said sockets.

4. A device according to claim 3, wherein the legs are releasably inserted into said sockets.

5. A device according to claim 3, wherein the stall has a wall (7') defining a head end, and wherein said device further comprises a bar (34') for connecting one of said pipe sockets with said wall.

6. A device according to claim 2, wherein said bail has a U-shaped design.

7. A device according to claim 1, further comprising second upright support means and second boundary means, said second boundary means being laterally aligned with said boundary means and connected thereto by a connecting bar (34), said device laterally defining two stalls arranged in head-to-head arrangement.

8. A device according to claim 1, wherein said belt (8) has a loop (9) formed at its lower end, and wherein said means for connecting comprises a bar (24) which projects on both sides beyond edges of the loop, and floor plates (22,23) having end portions of said bar secured thereto, said floor plates being securable to the floor of the stall.

9. A device according to claim 8, wherein the relationship between said loop and said means for connection is such that said loop is spaced from the portion of the floor supporting said floor plates.

10. A device according to claim 8, wherein the bar (24) is welded to a floor plate (22,23) adjacent both ends thereof respectively, and that said floor plates (22,23) have holes (26) extending perpendicular to the longitudinal axis of said bar (24), said holes enabling the floor plates (22,23) together with the bar (24) welded thereto to be screwed to the stall floor by means of screws.

11. A device according to claim 1, wherein said upright support means and said belt extend vertically.

12. A device according to claim 1, wherein the belt (8) is at last 15 cm (approx. 6 in) in width.

13. A device according to claim 12, wherein the belt (8) consists of a polyester material and is 5 mm (approx. ¼ in) thick.

14. A device according to claim 13, wherein the belt (8) is equipped at both ends with a loop (9) which serves to secure it.

* * * * *